United States Patent [19]

Wahrén

[11] Patent Number: 4,718,349
[45] Date of Patent: Jan. 12, 1988

[54] CONVEYOR LINE FOR HEAVY GOODS CONVEYING

[76] Inventor: Per E. Wahrén, Strandgatan 2, S-592 00 Vadstena, Sweden

[21] Appl. No.: 868,243

[22] Filed: May 28, 1986

[30] Foreign Application Priority Data

May 29, 1985 [SE] Sweden .............................. 8502654

[51] Int. Cl.⁴ ...................... B61B 13/12; B65G 29/00
[52] U.S. Cl. ................................. 104/165; 198/803.01
[58] Field of Search ............ 198/465.1, 465.2, 803.01, 198/619; 104/165, 172.3

[56] References Cited

U.S. PATENT DOCUMENTS

| | | | |
|---|---|---|---|
| 2,826,319 | 3/1958 | Renner et al. | 104/165 X |
| 3,211,279 | 10/1965 | Smith | 198/803.01 X |
| 3,768,624 | 10/1973 | Kornylak | 104/165 X |
| 4,593,623 | 6/1986 | Gutekunst et al. | 104/165 X |
| 4,619,205 | 10/1986 | Sticht | 104/165 X |

*Primary Examiner*—Nancy J. Stodola

[57] ABSTRACT

A conveyor line with pallets for conveying heavy loads has a guide member (3) with a U-shaped cross section in which there runs a conveyor belt (2), which can be guided rectilinearly or in curves and comprises links of glidable material. Pallets (6) carrying objects are conveyed along the line. The pallets have two guide segments (11) swivelable about vertical axes (x—x) in tandem in the conveying direction and via support rollers (8) said segments bear against separate support members (7), one on either side of the guide member (3). The guide segments have glide shoes (20) mounted coaxially with the axes (x—x) for yieldingly engaging against the belt (2) so that the pallet accompanies the belt in its movement. The segments have guide rollers (30) following opposing, parallel walls (4,4) of the U section guide member for positioning the guide segments along the straight and curved portions of the line. The belt is not loaded by the weight of the conveyed load and only be suited compression force from the guide shoe allowing the pallet to be kept stationary while gliding against the belt without the belt being subjected to excessive tensional load due to large friction forces.

12 Claims, 6 Drawing Figures

CONVEYOR LINE FOR HEAVY GOODS CONVEYING

The present invention relates to a conveyor line with pallets for conveying heavy loads, the line including a continuously moving conveyor belt, guided between parallel, fixed walls on either side of the belt, and the pallet with its load accompanying the belt in its movement by friction between the belt and pallet, the latter being kept stationary at given places along the line while the belt glides relative thereto.

Conveyor lines of this kind are used in mass production for conveying objects between different work stations. The object fastened to the pallet is moved from one station to the next with the aid of the pallet, which is then carried on the conveyor belt and accompanies the latter in its movement. The conveyor belt is a flexible link belt, which may be guided linearly and in curves so as to reach the stations in question, and after completed processing of the object the belt moves it further. The conveyor belt, pallets and their support surfaces are made of material providing sufficient friction for the pallet to accompany the movement of the belt, yet enabling the belt to glide relative to the pallet, without great loss of power, when the pallet with the object carried thereby is kept still. The pallets rest on special support means on the belt and by these means are guided between the parallel walls of the conveyor line at the same time.

These conveyor lines work satisfactorily for conveying light objects between the work stations. However, there are certain problems with conveying heavy objects with weights in the order of magnitude of 100-200 kg. A pallet carrying such a weight develops significant frictional forces between the pallet support surface and the conveyor belt, as well as between the belt and its support surface against the conveyor. The belt usually glides against a fixed bottom wall of the conveyor, which joins the fixed vertical walls so that a U-shaped trough is formed.

When the pallet is to be conveyed from a stationary position at a work station, the friction the friction forces that result produce a corresponding acceleration force on the pallet, there being initial slippage between the belt and the pallet until the pallet assumes the speed of the belt. The pallet is arrested once again at a subsequent station for further work on the object. Certain deviations in the transport flow may then result because several pallets collect upstream of a stationary pallet in a work station. In such event considerable friction forces may be developed by several pallets gliding against the belt upstream of this station.

The result of these friction forces from the conveyance of heavy objects would be the belt being subjected to a large pulling force with a corresponding load on the driving equipment and the guide means at the places where the belt changes direction. Furthermore, the otherwise sufficient, light support structure for guiding the belt and pallets on the conveyor requires considerable reinforcement.

The invention has the object of providing a conveyor line of the kind mentioned above, using otherwise normally available items, namely conveyor belt, driving means for the belt and guide means for the belt and pallets, and which allows conveyance of relatively heavy objects while ensuring normal loads on the belt and conveyor installation. This object is achieved by a conveyor line of the kind mentioned in the introduction being given the characterising features disclosed in the accompanying claim 1.

Since practically the entire load from the pallet is taken up on the fixed support members, the conveyor works independently of the weight of the conveyed object (the load). An increase in this load merely results in that the pallet is accelerated somewhat more slowly. The friction force between the pallet and belt is determined solely by the adjustable, yielding engagement force of the pallet glide shoe against the belt. There is thus obtained gently starting of the pallet after its stationary state, arresting the pallet being merely dependent on the required retardation force applied to the moving mass (the pallet plus object), with the addition of only a minor friction force. A plurality of pallets collected upstream of a work station develop a relatively small friction force against the belt. The arrangement of swiveleable guide segments on the pallet enables secure guidance of the pallet on a straight path as well as at curves.

In preferred embodiments of the invention, the pallet is supported via support rollers of low-friction type on the support members, and is guided by similar rollers between the guide walls of the conveyor, whereby only minor resistance to movement of the pallet occurs.

In a further, preferred embodiment, the glide shoe is adapted yieldingly to press against the conveyor belt with the aid of a spring means, whereby the compression force is adjustable to a value suited to prevailing conditions.

The invention will be described below in the form of an embodiment and with reference to the accompanying drawings.

Figure 1:
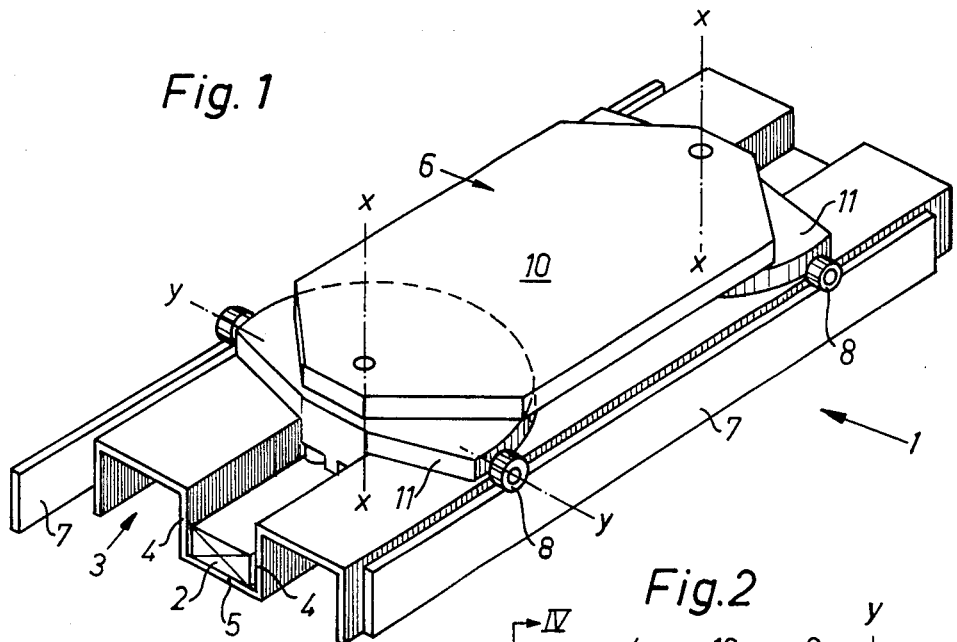
FIG. 1 is a perspective view of a conveyor with a pallet in accordance with the invention.
Figure 2:
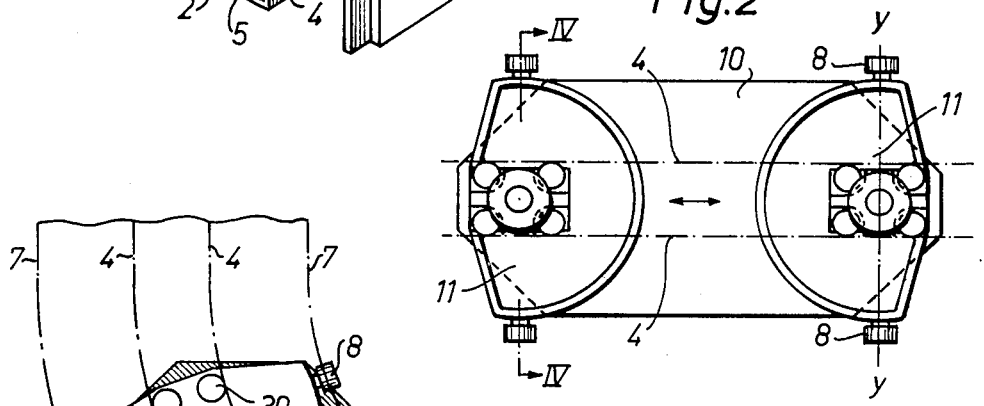
FIG. 2 is a view of the pallet to a smaller scale, as seen from below.

FIG. 1 illustrates the conveyor, generally denoted by the numeral 1, with associated pallet in accordance with the invention. The conveyor includes a guide member 3 in the form of a metal section, with a central trough defined by two side walls, 4,4 and a bottom wall 5. Horizontal portions of the member with folded-over stiffening flanges extend from the upper edges of the side walls. At the bottom of the trough there is a conveyor belt 2 running in engagement with the bottom wall and with clearance to the side walls 4,4. The belt extends upwards to about half the height of the side walls. The pallet 6 is guided in the central trough as described below. The pallet 6 includes a carrying plate 10 adapted to carry an non-illustrated object. Guide elements or segments 11,11 are mounted for movement about vertical axes x—x at either end of the carrying plate, viewed in its direction of movement. A rotatably mounted support roller 8 is mounted on either side of the guide segment 11. The common axis y—y for the rollers intersects the axis x—x at right angles. The support rollers 8,8 each rests on the upper surface of two fixed support members 7,7 arranged one on either side of the guide member 3. When the pallet 6 moves along the conveyor line, the rollers 8 roll on their respective support members 7.

The fixed support members 7,7 may be mounted as separate units at the sides of the guide member 3, or they may be integral therewith. The side portions of the guide member may also be fabricated such as to include support surfaces for the rollers 8,8.

The conveyor belt 2 comprises links enabling it to be guided in relatively sharp curves. It is made from material with suitable gliding properties in relation to the metal guide member 3. The belt is preferably made from acetal.

Figure 4:
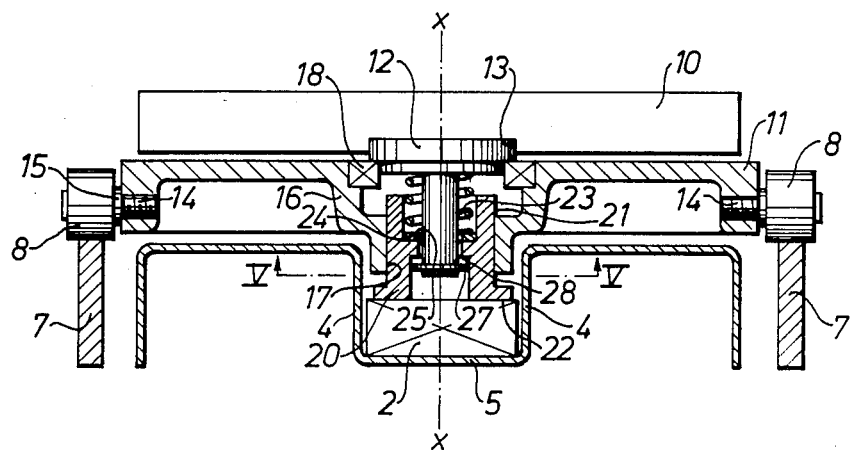
FIG. 4 is a section to a larger scale along the line IV—IV in FIG. 2.
Figure 5:
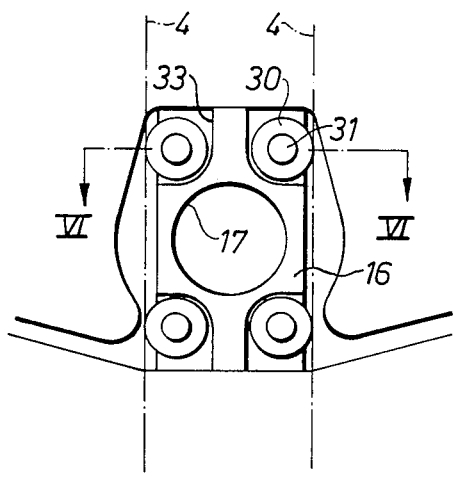
FIG. 5 illustrates a portion of the guide segment of the pallet in section along the line V—V in FIG. 4, with the glide shoe removed.

FIG. 4 illustrates the connection of guide element or segment 11 to the pallet carrying plate 10. This connection can be made, for example, by using a rolling bearing 18, arranged concentrically with the axis x—x, the outer ring of the bearing resting on an abutment on the guide segment 11 and its inner ring centered on a boss 12 accommodated in a recess 13 on the carrying plate 10. The boss 12 may be pressed into the carrying plate 10, or be attached to it in some other way. The Figure shows further details of the support rollers 8. These are suitably journalled on pins 14 threaded into the guide segment 11, and provided with spacer washers 15.

The guide segment is formed as a downwardly directed housing 16 about the centering boss 12. Coaxial with the x—x axis the housing has a bore 17, which glidably accommodates a cylindrical, sleeve-shaped glide shoe 20 having an exterior glide surface 21. The glide shoe 20 has limited vertical movement in the bore 17. The lower flat surface 22 of the shoe is disposed yieldingly to engage the upper side of the belt 2 under the bias of a compression spring 23 arranged about the lower, shaft-like part of the boss 12. Upwardly the spring bears against a shoulder on the boss, and downwardly against an interior shoulder 25 on the shoe 20 via a washer 24. When the glide shoe does not engage against the belt 2, e.g. when the pallet is removed from the conveyor, this movement is limited downwardly by a stop collar 27. In a normal working position the shoe is pressed yieldingly against the belt by the spring 23. The spring bias can be adjusted by the insertion of a spring with a suitable characteristic and/or in combination with a washer 24 of suitable thickness.

Figure 6:
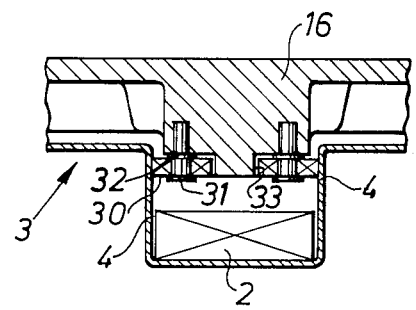
FIG. 6 is a section along the line VI—VI in FIG. 5.

The lower part of the guide segment housing 16 extends somewhat below the side walls 4,4 as will be particularly observed in FIGS. 4 and 6. Two pairs of guide rollers 30 with vertical axes are rotatably mounted in recesses 33 on the underside of the housing. The rollers 30 have rolling bearings mounted on journalling pins 31 threaded into the housing, with spacer washers 32 between the bearing inner ring and the bottom of the recess 33. The outer circumference of the guide rollers 30 extends somewhat outside the vertical, lower, flat side portions of the housing 16, and for guidance engage against the inner faces of the guide member side walls 4,4 with a small clearance demanded by the manufacturing tolerances of the guide member 3. In accurately made guide members, e.g. those from extruded sections, this clearance may be less than a total of 0.5 mm. The undersides of the guide rollers 30 may be flush with the underside of the housing 16, as is illustrated in FIG. 6. The guide rollers 30 are preferably placed symmetrically about the axis x—x, i.e. so that a pair of guide rollers transverse the conveyor line is at the same distance from the axis y—y common to support rollers 8 as the other pair of guide rollers 30.

Figure 3:
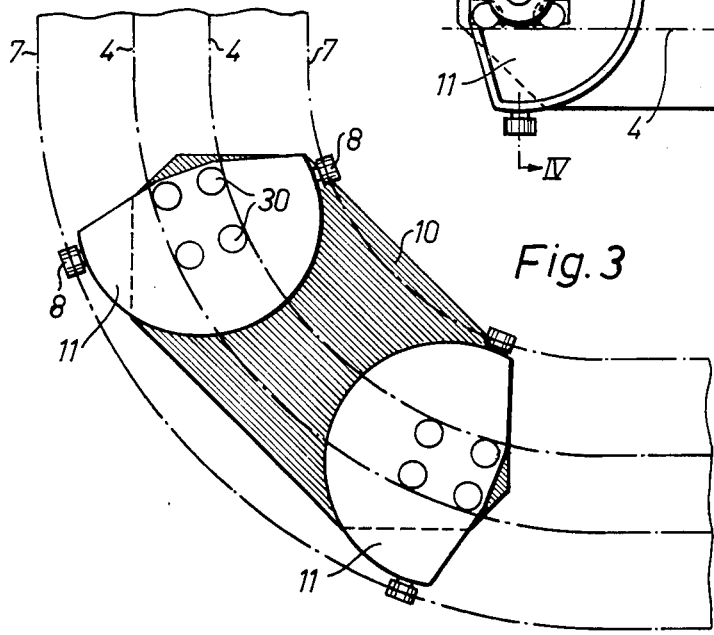
FIG. 3 is a schematic view of the pallet in FIG. 2 during passage through a curve.

It will be understood from what has been said hereinbefore that means necessary for causing the pallet to accompany the movement of the conveyor belt and for guiding the pallet along the conveyor line are arranged concentrically about both swivelling axes x—x. There is accordingly achieved a function balanced in all respects of the advance as well as the guidance of the pallet along the conveyor line. The pallet will thus be accelerated, conveyed and retarded while moving very smoothly in both straight and curved paths. The situation for a pallet during passage through a curve is schematically illustrated in FIG. 3. The outer and inner support members 7,7 are disposed for keeping parallel to the side walls 4,4 of the guide member about a common centre of curvature, the common axis y—y of the support rollers 8 passing through this centre with the rollers 8 rotating in planes tangential to the paths of curvature of the support members 7,7. The support rollers 8 roll without any tendency to rub against their respective support members 7. Any slipping between the pallet and conveyor belt and the friction consequent thereon has no effect on the stability of the pallet on the line. It should be particularly noted that the lateral stability of the pallet is very good, both in a straight path and to an unaltered extent at curves. The pallet may therefore be conveyed at a relatively high speed (in the order of magnitude of 25 m/s) for heavy loads as well.

In the embodiments illustrated on the drawing the guide segments are sector-shaped about the swivelling axes x—x in the portions of the segments facing each other. The shape of the guide segments may of course be varied, while retaining a symmetrical arrangement of the support and guide rollers about the axes x—x.

According to the description above, both segments are provided with glide shoes. It is of course possible merely to provide one guide segment with a glide shoe, but both segments must have guide rollers 30. However, it is usually preferred to make both guide shoes identical, with all their associated parts in the described symmetrical arrangement.

I claim:

1. Conveyor line comprising at least one pallet for conveying heavy loads, the line including a continuously moving conveyor belt guided for movement between fixed, parallel, guide walls, said pallet being operatively related to said belt for frictional drive thereby when movement of the pallet along the conveyor line is unimpeded and for gliding movement of said belt relative to the pallet when said movement of the pallet is restrained, the improvement consisting in that fixed support members are provided parallel to and at opposite sides of said guide walls, at least one guide element effectively supporting said pallet and in turn being supported by said fixed support members for movement therealong, said guide element also being mounted for movement about a vertical axis to enable movement of the pallet about curved sections, if any, in the conveyor line, and a glide shoe operatively related to said guide element and said belt and including means for yieldingly engaging the glide shoe with the belt to convey the pallet along the conveyor line when the pallet is loaded.

2. The conveyor line of claim 1, wherein support rollers, aligned along a common axis, are carried by the guide element for engaging said fixed supporting members, said common axis being perpendicular to and intersecting said vertical axis.

3. The conveyor line of claim 2, wherein two pairs of guide rollers are provided on the guide element facing but spaced from said belt, each guide roller being mounted for movement about a vertical axis, one pair of rollers being arranged on one side of said common axis and an other pair of rollers being arranged at an opposite side of said common axis, said two pairs of guide rollers being confined for movement within said guide walls with small clearance.

4. The conveyor line of claim 3, wherein said guide rollers are symmetrically arranged with respect to said vertical axis about which said guide element is movable.

5. The conveyor line of claim 1, wherein the glide shoe comprises a cylindrical sleeve coaxially mounted with the guide element for vertical movement relative thereto, an end surface of the sleeve yieldingly engaging the upper surface of the belt.

6. The conveyor line of claim 5, wherein said means for yieldingly engaging said gliding shoe with said belt comprises a compression spring, and means for adjusting the pressing force.

7. The conveyor line of claim 1, wherein the parallel, fixed guide walls define a central trough for the conveyor belt and the fixed support members are separate members.

8. The conveyor line of claim 1, wherein the parallel, fixed guide walls define a guide member with a central trough for the conveyor belt, and the fixed support members are integral with the guide member.

9. Conveyor line comprising at least one pallet for conveying heavy loads, the line including a continuously moving conveyor belt guided for movement between fixed, parallel guide walls, said pallet being operatively related to said belt for frictional drive thereby when movement of the pallet along the conveyor line is unimpeded and for gliding movement of the belt relative to the pallet when said movement of the pallet is restrained, the improvement consisting in that fixed support members are provided parallel to, and on either side of said guide walls, at least one guide element above said belt and mounted for movement about a vertical axis, said guide element carrying and being supported by rollers at its opposite lateral sides, which rollers engage said fixed support members to space the guide element from said belt, and a glide shoe operatively related to said guide element for vertical movement relative thereto and having one end engaging said belt, and means operatively related to said glide shoe for movement of the glide shoe relative to said guide element, said means cooperating with said fixed support members for supporting the pallet.

10. The conveying line of claim 9, wherein said means comprises a boss having a reduced extension and includes a spring between the glide shoe and said boss.

11. The conveyor line of claim 9, wherein said rollers carried by said guide element lie along a common axis, said guide element being movable about said vertical axis on a roller bearing arranged concentrically with said vertical axis, said roller bearing having an outer ring supported on an abutment on the guide element and having an inner ring centered on said boss.

12. The conveyor line of claim 9, wherein the pallet includes a load carrying plate, two guide elements being being provided, one at each end of said load carrying plate.

* * * * *